US010755710B2

(12) United States Patent
Chen

(10) Patent No.: US 10,755,710 B2
(45) Date of Patent: Aug. 25, 2020

(54) VOICE RECOGNITION LAMP CAPABLE OF NETWORKING AND VOICE RECOGNITION LAMP CONTROL SYSTEM THEREOF

(71) Applicant: SHENZHEN LIGHT LIFE TECHNOLOGY CO., LTD., Shenzhen, Guangdong (CN)

(72) Inventor: Mang Chen, Guangdong (CN)

(73) Assignee: SHENZHEN LIGHT LIFE TECHNOLOGY CO., LTD., Shenzhen (CN)

( * ) Notice: Subject to any disclaimer, the term of this patent is extended or adjusted under 35 U.S.C. 154(b) by 306 days.

(21) Appl. No.: 16/061,340

(22) PCT Filed: Dec. 14, 2015

(86) PCT No.: PCT/CN2015/097301
§ 371 (c)(1),
(2) Date: Jun. 11, 2018

(87) PCT Pub. No.: WO2017/100984
PCT Pub. Date: Jun. 22, 2017

(65) Prior Publication Data
US 2019/0043502 A1   Feb. 7, 2019

(51) Int. Cl.
*G10L 15/00* (2013.01)
*G10L 15/22* (2006.01)
(Continued)

(52) U.S. Cl.
CPC .............. *G10L 15/22* (2013.01); *G08C 17/02* (2013.01); *G10L 15/30* (2013.01); *H04W 4/00* (2013.01);
(Continued)

(58) Field of Classification Search
CPC combination set(s) only.
See application file for complete search history.

(56) References Cited

U.S. PATENT DOCUMENTS

2014/0285113 A1   9/2014   Huang

FOREIGN PATENT DOCUMENTS

| CN | 201408365 Y | 2/2010 |
| CN | 103899963 A | 7/2014 |
| CN | 104582153 A | 4/2015 |

OTHER PUBLICATIONS

International Search Report of PCT Patent Application No. PCT/CN2015/097301 dated Aug. 29, 2016.

*Primary Examiner* — Vu B Hang

(57) ABSTRACT

A voice recognition lamp capable of networking comprising: an audio collection element, a voice processing unit, a control unit, an electroluminescent element, an RF communication module, and a storage unit containing pre-stored voice sample data of commands to operate the lamp, voice ID data of the lamps in the network, and radio frequency communication addresses corresponding to same; the voice processing unit compares received audio information with the pre-stored data in order to acquire the radio frequency communication address and operating command corresponding to the matched audio information, the RF communication module being used for sending the operating command to the voice recognition lamp corresponding to the radio frequency address, and the control unit being used for controlling the electroluminescent element to execute the corresponding operating command. The operation is simple, and remote control of a smart terminal can be implemented.

10 Claims, 6 Drawing Sheets

(51) Int. Cl.
    *G08C 17/02*     (2006.01)
    *H04W 4/00*     (2018.01)
    *H05B 47/12*     (2020.01)
    *H05B 47/19*     (2020.01)
    *G10L 15/30*     (2013.01)
    *H05B 45/00*     (2020.01)
    *H04W 4/33*     (2018.01)

(52) U.S. Cl.
    CPC ............. *H05B 47/12* (2020.01); *H05B 47/19* (2020.01); *G08C 2201/31* (2013.01); *G10L 2015/223* (2013.01); *H04W 4/33* (2018.02); *H05B 45/00* (2020.01)

VOICE RECOGNITION LAMP CAPABLE OF NETWORKING AND VOICE RECOGNITION LAMP CONTROL SYSTEM THEREOF

TECHNICAL FIELD

The present application relates to the field of lamps, and more specially, relates to a voice recognition lamp capable of networking and a voice recognition lamp control system thereof.

BACKGROUND

Lamps are common lighting equipment in people's daily life, including traditional incandescent lamps, energy-saving LED lamps, and voice-activated lamps and so on. During the use of the lamp, a switch (including a voice-activated switch) controls a lamp. When a user uses one lamp, the user needs to operate the switch of the lamp. In this case, when lights in multiple rooms need to be controlled by the switch, they must be operated on the corresponding switch panel. Even if the remote controller may be provided for remote control, but the communication distance of the infrared remote controller is limited, the control signal is easily blocked, and when the remote controller is not around, the lights can not be remotely controlled. Recently, there is a technology for switching on and off the light through a smart phone. However, the cost of a smart device that can be networked is high and cannot be used on a large scale, and it cannot be controlled when the smart phone is not around.

Technical Solutions

To overcome the deficiencies of the prior art, the present application provide a lamp that can solve the problem of inconvenient operation of the lamps and the high cost of intelligently controlling the lamps. Specifically, embodiments of the present application provide a voice recognition lamp capable of networking and a voice recognition lamp control system constructed using such voice recognition lamp.

According to the first aspect of the application, embodiments of the present application provide a voice recognition lamp capable of networking, comprising an audio collection element, a voice processing unit, a control unit, an electroluminescent element, a RF communication module capable of networking with other voice recognition lamps, and a storage unit containing pre-stored voice sample data of commands to operate the lamp, voice ID data of the lamps in the network and radio frequency communication addresses corresponding to same; the audio collection element is configured to collect audio information, and send the audio information to the voice processing unit; the voice processing unit is configured to match the audio information from the audio collection element and the pre-stored data in the storage unit to acquire radio frequency communication addresses and operating commands corresponding to the matched audio information, and send the radio frequency communication addresses and operating commands to the control unit; the control unit is configured to control the RF communication module to send operating commands to other voice recognition lamps corresponding to the radio frequency communication addresses, or to respond to the operating commands from the RF communication module, or to respond to the operating commands from the voice processing unit, to control the electroluminescent element to execute the corresponding operating commands; the operating commands are at least one of "switch on", "switch off", "delay switching on", "delay switching off".

In the voice recognition lamp provided by the present application, the voice processing unit comprises: a preamplifier circuit connecting with an output of the audio collection element, an analog-to-digital converter being used for converting an amplified signal to a digital signal, and a processor being used for processing the digital signal; the processor has a built-in or external storage containing pre-stored voice sample data of commands to operate the lamp, voice ID data of the lamps in the network and radio frequency communication addresses corresponding to same.

In the voice recognition lamp provided by the present application, further comprising a WIFI unit being used for accessing a wireless router network or WAN, and the WIFI unit is electronically connected with the control unit.

In the voice recognition lamp provided by the present application, the storage unit further storages voice ID data of the voice recognition lamps capable of networking with anther network through the WIFI unit, and its corresponding network address and radio frequency communication address;

the control unit confirms whether an operation command sender has permission to operate when receiving the operating commands and radio frequency communication address for the voice recognition lamps of the network from other networks through the WIFI unit; if the operation command sender has permission to operate, transmitting the received operating commands to the voice recognition lamp having the received radio frequency communication address through the RF communication module;

when the control unit receives an operating command for a voice recognition lamp of another network recognized by the voice processing unit, the operating command and a network address and a radio frequency communication address of the voice recognition lamp to be operated by the operating command are sent to the control unit of the corresponding network address through the WIFI unit the control unit of the corresponding network address sends the operating command to the control unit of the corresponding radio frequency communication address through the RF communication module; when the control unit sends the operating command, if detecting that the WIFI unit cannot access the wireless router network or the WAN, sounding that the voice command fails.

In the voice recognition lamp provided by the present application, further comprising a sound unit connecting with the control unit, the control unit controls the sound unit to sound when receiving a voice play command from the RF communication module or the voice processing unit.

According to the first aspect of the application, a voice recognition lamp control system is provided, comprising a main lamp device and at least one auxiliary lamp device, each of the main lamp device and the auxiliary lamp device has a unique radio frequency communication address and corresponding voice ID data, and the voice ID data can be set and changed;

the main lamp device comprising a first audio collection element, a first voice processing unit, a first control unit, a first electroluminescent element, a first RF communication module and a WIFI unit; the first audio collection element is electronically connected with the first voice processing unit; the first voice processing unit, the first electroluminescent element, the first RF communication module and the WIFI unit are all electronically connected with the first control unit; the main lamp device further comprises a first storage unit containing pre-stored voice sample data of commands to operate the lamp, voice ID data of lamps in the voice recognition lamp control system and radio frequency communication addresses corresponding to same;

the auxiliary lamp device comprises a second audio collection element, a second voice processing unit, a second control unit, a second electroluminescent element, and a second RF communication module communicably connected with the first RF communication module; the second audio collection element is electronically connected with second voice processing unit; the second voice processing unit, the second electroluminescent element and the second RF communication module are all electronically connected with the second control unit; the auxiliary lamp device further comprises a second storage unit containing pre-stored voice sample data of commands to operate the lamp, voice ID data of lamps in the voice recognition lamp control system and radio frequency communication addresses corresponding to same.

In the voice recognition lamp control system provided by the present application, the first storage unit of the main lamp device further pre-stores voice ID data of each voice recognition lamp in other networks that can be communicated via WIFI, and its corresponding network address and radio frequency communication address.

In the voice recognition lamp control system provided by the present application, further comprises at least one controlled device; the controlled device has a unique radio frequency communication address and corresponding voice ID data; each of the controlled device comprises a third processing unit, a third RF communication module and an electric actuator; the third RF communication module is communicably connected with the first RF communication module or the second RF communication module; when the third RF communication module is networked with the first RF communication module and the second RF communication module, the first storage unit and the second storage unit respectively store the radio frequency communication address of the controlled device and the corresponding voice ID data; when any audio collection element in the voice recognition lamp control system collects a voice command to operate the controlled device, the corresponding voice processing unit and processing unit in the voice recognition lamp control system finds out the radio frequency communication address of the controlled device, and sends the collected voice command to the third RF communication module through the corresponding RF communication module; after receiving the operating commands from the third RF communication module, the third processing unit controls the electric actuator to execute the operating commands.

In the voice recognition lamp control system provided by the present application, the main lamp device further comprises a first sound unit connected with the first control unit; when receiving a voice play command from the first RF communication module or the first voice processing unit, the first control unit controls the first sound unit to sound.

In the voice recognition lamp control system provided by the present application, the auxiliary lamp device further comprises a second sound unit connected with the second control unit; when receiving a voice play command from the second RF communication module or the second voice processing unit, the second control unit controls the second sound unit to sound.

Advantageous Effects

The following beneficial effects can be achieved by the technical solution provided by the embodiment of the present application:

by setting an audio collection element, a voice processing unit, a control unit, an electroluminescent element, a RF communication module capable of networking with other voice recognition lamps, and a storage unit containing pre-stored voice sample data of commands to operate the lamp, voice ID data of the lamps in the network and radio frequency communication addresses corresponding to same in the voice recognition lamp, the voice processing unit matches the audio information with the pre-stored voice ID data and operational sample data to acquire radio frequency communication addresses and operating commands corresponding to the audio information, and sends the radio frequency communication addresses and the operating commands to the control unit; based on the radio frequency communication address, the control unit sends operating commands to the corresponding voice recognition lamp to control the switching on and off of the voice recognition lamp; meanwhile, the control unit can receive operating commands sent by the RF communication module and transmitted from other voice recognition lamps in the network, and based on the received operating commands to control the switching on and off of the electroluminescent element. In this way, the user can control the switching on and off of any voice recognition lamp in the communication network through voice. The voice recognition lamp is simple in operation, convenient in use, and has a good user experience.

BRIEF DESCRIPTION OF THE DRAWINGS

In the drawings: In order to more clearly explain the technical solutions in the embodiments of the present application, the drawings used in the description of the embodiments will be briefly described below. Obviously, the drawings in the following description are merely some embodiments of the present application. For a person of ordinary skill in the art, other drawings may also be obtained on the basis of these drawings without any creative work.

DETAILED DESCRIPTION OF THE PREFERRED EMBODIMENT

In order to make the purpose, technical solutions and advantages of the present application become clearer, the following will describe the embodiment of the present application in further detail with reference to the accompanying drawings.

In order to facilitate understanding of the solution of the present application, the application scenario of the present application is briefly introduced first: multiple voice recognition lamps are networked through their respective RF communication modules; voice recognition lamps of different networks are communicated by WIFI units; the network of each voice recognition lamp has a unique network address; each voice recognition lamp in the network has a unique radio frequency communication address. In the same network, the corresponding voice recognition lamp can be directly found according to the radio frequency communication address. In different networks, it is necessary to first find the network where the voice recognition lamp is located through the network address, and then find the voice recognition lamp through the radio frequency communication address in the network.

First Embodiment

Figure 1:
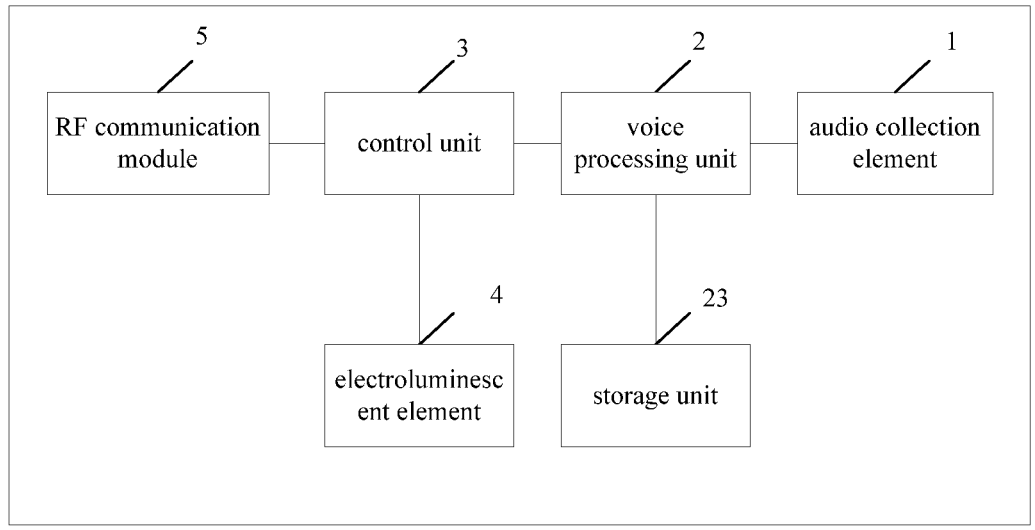
FIG. 1 is a schematic structural diagram of a voice recognition lamp capable of networking according to a first embodiment of the present application.

The embodiment of the present application provides a voice recognition lamp capable of networking. As shown in FIG. 1, this voice recognition lamp capable of networking comprises an audio collection element 1 (for example, a microphone), a voice processing unit 2, a control unit 3, an electroluminescent element 4 (it can be an LED or LED lamp group that acts as an illumination), a RF communication module 5 (it can be a 2.4 G communication module) capable of networking with other voice recognition lamps, and a storage unit 23 containing pre-stored voice sample data of commands to operate the lamp, voice ID data of the lamps in the network (that is, each voice recognition lamp in the network composed of communications through respective RF communication modules 5) and radio frequency communication addresses corresponding to same.

As shown in FIG. 1, the audio collection element 1 and the voice processing unit 2 are electrically connected. The voice processing unit 2, the electroluminescent element 4, the RF communication module 5 are all electrically connected with the control unit 3. Both the voice processing unit 2 and the control unit 3 can be electrically connected with the storage unit 23, or the storage unit 23 is integrated in the voice processing unit 2 or the control unit 3.

The audio collection element 1 is used for collecting audio information, and sending the audio information to the voice processing unit 2. The voice processing unit 2 is used for matching the audio information from the audio collection element 1 and the pre-stored data (comprising voice sample data of commands, voice ID data, and radio frequency communication address) in the storage unit 23 to acquire the radio frequency communication address and operating commands corresponding to the matched audio information, and send them to the control unit 3. The control unit 3 is used for controlling the RF communication module 5 to send operating commands to other voice recognition lamps corresponding to the radio frequency communication address, or responding to the operating commands received from the RF communication module 5 (which is in the same voice recognition lamp with the control unit 3), or responding to operating commands from the voice processing unit 2 (which is in the same voice recognition lamp with the control unit 3), to control its own electroluminescent element 4 (which is in the same voice recognition lamp with the control unit 3) to execute corresponding operating commands. The operating commands are at least one of "switch on", "switch off", "delay switching on", "delay switching off".

In this embodiment, the storage unit 23 pre-stores the voice sample data of commands to operate the lamp, voice ID data of the lamps in the network (that is, each voice recognition lamp in the network composed of communications through respective RF communication modules 5) and radio frequency communication addresses corresponding to same. Wherein, the voice sample data of operating commands (that is the voice sample data of commands to operate the lamp) can comprise "open, close, switch on, switch off, delay switching on in 5 minutes, delay switching off in 10 minutes" and so on.

For example, in a situation where there are three networked voice recognition lamps through the RF module, each voice recognition lamp will pre-store the following three sets of data, which contains the signal code corresponding to the "switch on" and "switch off" voice commands. For example, "0" means switch on, "1" means switch off:

| | | | |
|---|---|---|---|
| voice ID data of "living room" | A00003 radio frequency communication address of the lamp of the "living room" | voice sample data of the "switch on" operating command | voice sample data of the "switch off" operating command |
| voice ID data of "kitchen" | A00002 radio frequency communication address of the lamp of the "kitchen" | voice sample data of the "switch on" operating command | voice sample data of the "switch off" operating command |
| voice ID data of "bedroom" | A00001 radio frequency communication address of the lamp of the "bedroom" | voice sample data of the "switch on" operating command | voice sample data of the "switch off" operating command |

When the voice processing unit 2 of the lamp in the bedroom receives the command of "switch on the lamp of the bedroom" from the audio collection element 1, the control unit 3 directly controls the electroluminescent element 4 to emit light; when the voice processing unit 2 of the lamp in the bedroom receives the voice command of "switch on the lamp of the kitchen" from the audio collection element 1, the control unit 3 acquires the RF communication address of the lamp in the kitchen, and give the command of "switch on the lamp" (that is "0") to the RF communication module 5 to send it to the radio frequency communication address (that is "A00001") to the lamp of the kitchen online; after the RF communication module 5 of the lamp in the kitchen receives the command, it is transferred to the control unit 3 to make electroluminescent element 4 of the lamp to emit light. As you can see, in actual operation, the voice processing unit 2 matches the actual audio information collected from the audio collection element 1 with the pre-stored voice ID data ("kitchen", "living room", "bedroom") and operating sample data ("switch on" or "switch off") to acquire the radio frequency communication address and operating commands corresponding to the audio information; the control unit 3 decides whether directly controls the electroluminescent element 4 to emit light, or provide it to the RF communication module 5 to transfer it to another voice recognition lamp in the same network. In other words, on one hand, the control unit 3 receives the voice recognition results of the voice processing unit 2 to decide whether to emit light or send it to other voice recognition lamps to "make it emit light"; on the other hand, the control unit 3 also receives operating commands from the RF communication module 5, that is, to make the voice recognition lamp corresponding to the radio communication address to be swathed on or off.

In this embodiment, the radio frequency communication addresses of the multiple voice recognition lamps in the same network (for example, the three voice recognition lamps of the above network) may be fixed at the time of delivery. However, the voice ID data corresponding to the radio frequency communication address can be set and modified. One voice ID data may be correspond to one radio frequency communication address, or multiple voice ID data may be correspond to one radio frequency communication address, but they should be identifiable.

In this embodiment, the voice ID data of the voice recognition lamp is the voice data corresponding to the voice recognition lamp ID, and can be completely defined by the customer. For example, three lamps can also be defined as a living room lamp a toilet lamp, a bedside lamp, etc; the sample data of operating commands can also be self-defined as "open", "close", and so on. When the user issues audio information of an operating command (such as switch on the living room lamp) towards a voice recognition lamp (such as a bedroom lamp), the voice processing unit 2 matches the audio information from the user and the pre-stored voice ID data (comprising voice ID data of this voice recognition lamp with the voice ID data of other voice recognition lamps communicated with this voice recognition lamp) and the operating sample data to acquire the radio frequency communication address and the operating command corresponding to the audio information; the control unit 3 receives the radio frequency communication address and the operating command from the voice processing unit 2, and sends the operating command (that is switch on) to the RF communication module 5 of the voice recognition lamp specified by the user (that is the living room lamp) through its RF communication module 5; based on the received operating command, the control unit 3 of the voice recognition lamp specified by the user (that is the living room lamp) controls the switching on and off of the specified voice recognition lamp (that is the living room lamp). Of course, the user can issue an operational indication to this voice recognition lamp, for example: the user give an operating command of "switch off bedside lamp" to the bedside lamp; after matching the voice operating command of the user, the voice processing unit 2 of the bedside lamp acquires the radio frequency communication address and operating command of the bedside lamp, and sends them to the control unit 3 of the bedside lamp; based on the radio frequency communication address corresponding to the bedside lamp, the control unit 3 directly controls the electroluminescent element 4 of the bedside lamp to switch off. Besides, when the RF communication module 5 of one voice recognition lamp receives the operating command from other voice recognition lamps, it will send the operating command to the control unit 3; and the control unit 3 controls the electroluminescent element 4 of the voice recognition lamp to be switched on and off.

In this embodiment, as an improvement, the state of the voice recognition lamp can be controlled to be "semi-switched on and semi-switched off" in addition to the "switched on" and "switched off". Since the e electroluminescent element 4 uses LEDs, this control is very direct. As described above, the sample data of the operating commands in sound form collected by the present application may have different settings, including the time length of the delay switching on and off, and the absolute time of switching on and off. For example, delay switching on the kitchen lamp in M minutes; delay switching off the living room in N minutes; switch on the bedroom lamp at 8 pm. After being identified, the control unit 3 performs the corresponding control.

Figure 2:
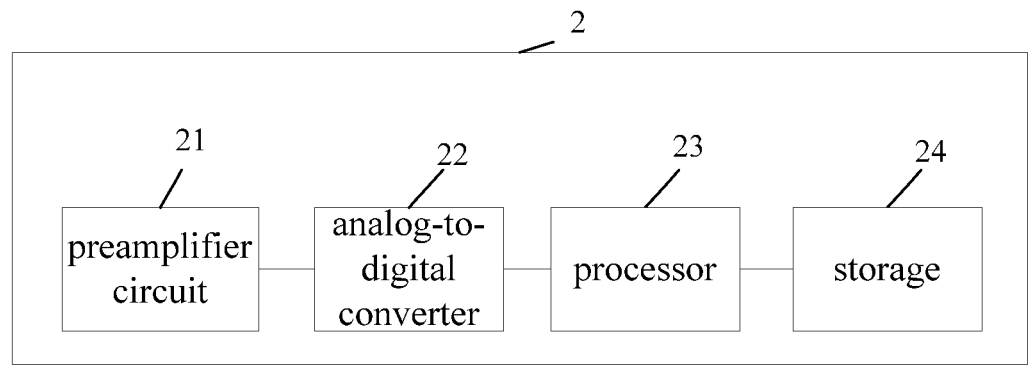
FIG. 2 is a schematic structural diagram of a voice processing unit according to a first embodiment of the present application.

Referring to FIG. 2, in this embodiment, the voice processing unit 2 may comprise a preamplifier circuit 21 connecting with an output of the audio collection element 1, an analog-to-digital converter 22 being used for converting an amplified signal to a digital signal, and a processor 23 being used for processing the digital signal; the processor 23 has a built-in or external storage 24 containing pre-stored voice sample data of commands to operate the lamp, voice ID data of the lamps in the network and radio frequency communication addresses corresponding to same.

In this embodiment, the preamplifier circuit 21 is connected with the output of the audio collection element 1, and is used for receiving the audio information from the audio collection element 1 and amplifying the corresponding analog signal; the analog-to-digital converter 22 is used for converting the amplified analog signal to the digital signal; the processor 23 has a built-in or external storage 24 containing pre-stored voice sample data of commands to operate the lamp, voice ID data of the lamps in the network and radio frequency communication addresses corresponding to same; after receiving the digital signal, the processor 23 will process the digital signal; specifically, the digital signal is matched with the data stored in the storage 24

Figure 3:
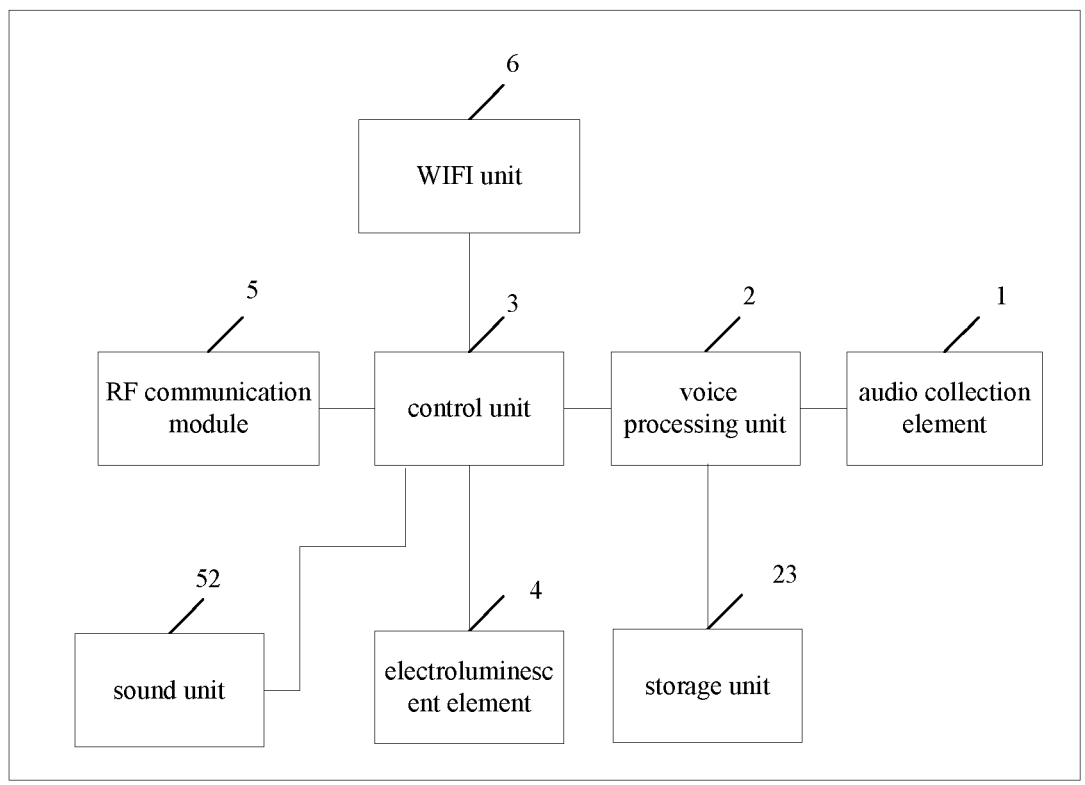
FIG. 3 is a schematic structural diagram of a voice recognition lamp capable of networking according to a first embodiment of the present application.

Referring to FIG. 3, in another embodiment, the voice recognition lamp capable of networking further comprises a WIFI unit 6 being used for accessing a wireless router network or WAN, and the WIFI unit 6 is electronically connected with the control unit 3. This kind of voice recognition lamp not only has the function of communicating with other voice recognition lamps within the network (network connected through the RF communication module 5), but also can communicate with other similar networks through the WIFI (network connected through the RF communication module 5) and access smart terminals.

In other words, the voice recognition lamp capable of networking in this embodiment can not only rely on the RF communication module 5 for wireless communication connection, but also can rely on the WIFI unit 6 to access other voice recognition lamp networks of the same type, such that the control unit 3 can control and process commands from other voice recognition light networks through the WIFI unit 6, and to control the corresponding voice recognition lamps to be switched on and off. In this way, the use of the voice recognition lamp network is increased, making the use of voice recognition lamps more extensive. For example, the smart phone APP can provide WIFI to access the network of the voice recognition lamp of the present application and to remotely set the voice ID data of each lamp etc.; and the voice recognition lamps in the network can also be directly controlled through the APP. Specifically, the WIFI unit 6 receives the command and the control unit 3 controls the electroluminescent element 4 to emit light or forwards the operating commands through the RF communication module 5 to a voice recognition lamp that cannot directly access other networks (the light does not have the WIFI unit 6 but only RF communication module 5).

For this purpose, the storage unit 23 also stores the voice ID data of the voice recognition lamp capable of networking that can be accessed to another network (a network connected through the respective RF communication modules 5) through the WIFI unit 6, and the corresponding network addresses and radio frequency communication addresses.

When receiving the operating commands and radio frequency communication address for the voice recognition lamps of the network (a network connected through the respective RF communication modules 5) from other networks (a network connected through the respective RF communication modules 5), the control unit 3 confirms whether an operation command sender (that is the voice recognition lamp in other networks sending the operating commands) has permission to operate; if the operation command sender has permission to operate, transmitting the received operating commands to the voice recognition lamp having the received radio frequency communication address through the RF communication module 5.

When the control unit 3 receives an operating command for a voice recognition lamp of another network recognized by the voice processing unit 2, the operating command and a network address and a radio frequency communication address of the voice recognition lamp to be operated by the operating command are sent to the control unit 3 (it is in a different network from that of the control unit 3 sending this operating command) of the corresponding network address through the WIFI unit 6 (it is in the same voice recognition lamp as the control unit 3 sending this operating command); the control unit 3 of the corresponding network address sends the operating command to the control unit 3 of the corresponding radio frequency communication address through the RF communication module 5; when the control unit 3 sends the operating command, if detecting that the WIFI unit 6 (it is in the same voice recognition lamp as the control unit 3 sending this operating command) cannot access the wireless router network or the WAN, sounding that the voice command fails.

In this embodiment, after adding the WIFI unit 6, the voice recognition lamp can control the communication connection with another network through the WIFI unit 6 to indirectly control the voice recognition lamp of the external network in voice, thereby realizing a remote control, increasing the control range of the voice recognition lamp, and providing support for smart terminals accessing the network via the Internet.

The voice recognition lamp shown in FIG. 3 further comprises a sound unit 52 connecting with the control unit 3, the control unit 3 controls the sound unit 52 to sound when receiving a voice play command from the RF communication module 5 or the voice processing unit 2

In this embodiment, a sounding unit 52 is added to the voice recognition lamp to notify whether the voice operation of the user is successful. Through voice feedback, the user can intuitively understand whether the remote operation is successful and improve the user experience.

In the present application, by setting an audio collection element, a voice processing unit, a control unit, an electroluminescent element, a RF communication module capable of networking with other voice recognition lamps, and a storage unit containing pre-stored voice sample data of commands to operate the lamp, voice ID data of the lamps in the network and radio frequency communication addresses corresponding to same in the voice recognition lamp, the voice processing unit matches the audio information with the pre-stored voice ID data and operational sample data to acquire radio frequency communication addresses and operating commands corresponding to the audio information, and sends the radio frequency communication addresses and the operating commands to the control unit; based on the radio frequency communication address, the control unit sends operating commands to the corresponding voice recognition lamp to control the switching on and off of the voice recognition lamp; meanwhile, the control unit can receive operating commands sent by the RF communication module and transmitted from other voice recognition lamps in the network, and based on the received operating commands to control the switching on and off of the electroluminescent element. In this way, the user can control the switching on and off of any voice recognition lamp in the communication network through voice. The voice recognition lamp is simple in operation, convenient in use, and has a good user experience.

Second Embodiment

Figure 4:
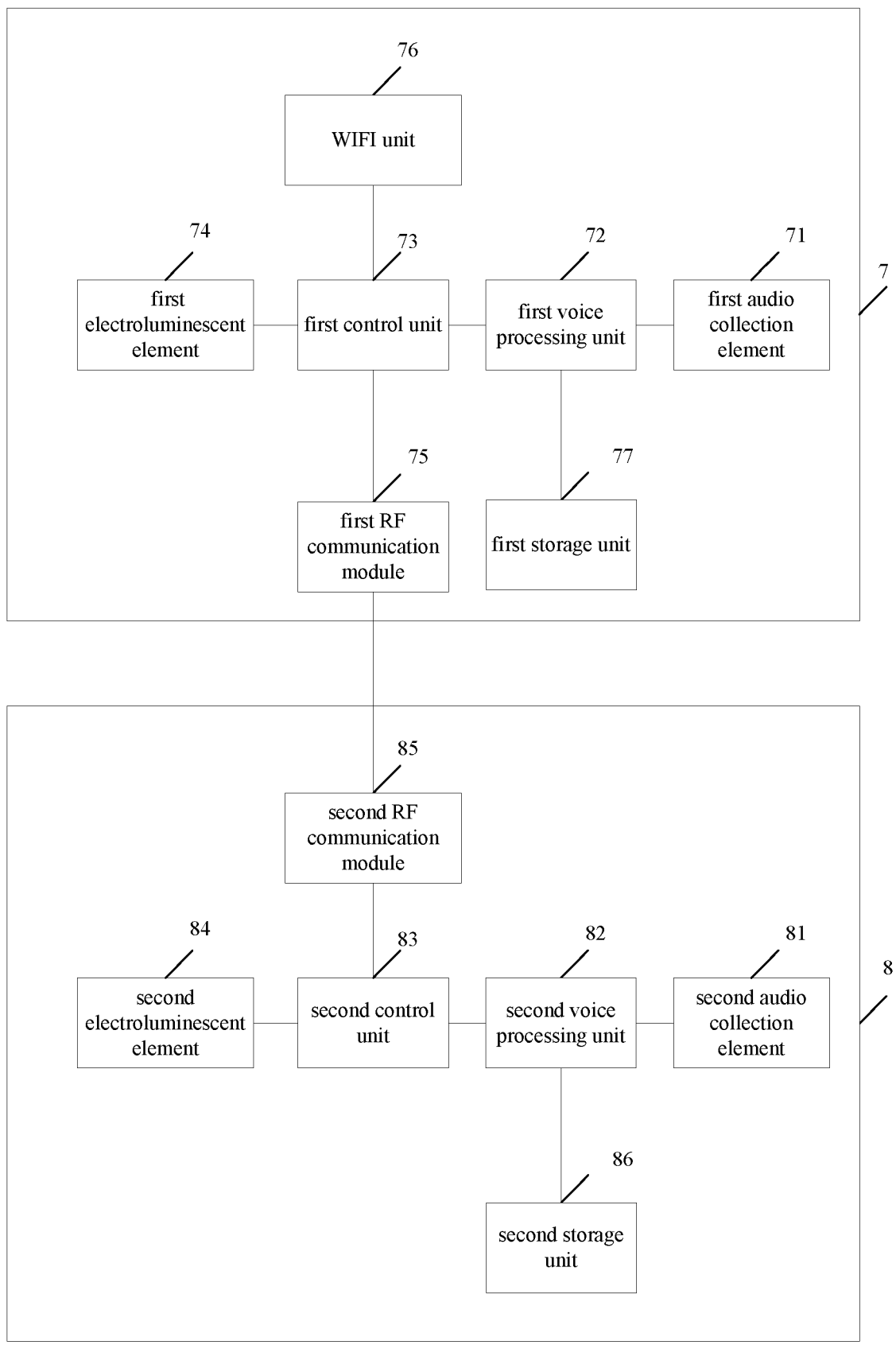
FIG. 4 is a schematic structural diagram of a voice recognition lamp control system according to a second embodiment of the present application.

The embodiment of the present application provides a voice recognition lamp control system, which uses the voice recognition lamps of the first embodiment for networking. Referring to FIG. 4, the voice recognition lamp control system comprises a main lamp device 7 and at least one auxiliary lamp device 8. Each of the main lamp device 7 and the auxiliary lamp device 8 has a unique radio frequency communication address, and a corresponding voice ID data can be set to be distinguished from each other. The voice ID data can be set before use or can be modified during the use.

The main lamp device 7 in the system of this embodiment can comprises a first audio collection element 71, a first voice processing unit 72, a first control unit 73, a first electroluminescent element 74, a first RF communication module 75, and a WIFI unit 76; the first audio collection element 71 is electronically connected with the first voice processing unit 72; the first voice processing unit 72, the first electroluminescent element 74, the first RF communication module 73 and the WIFI unit 76 are all electronically connected with the first control unit 73; the main lamp device 7 further comprises a first storage unit 77 containing pre-stored voice sample data of commands to operate the lamp, voice ID data of lamps in the voice recognition lamp control system and radio frequency communication addresses corresponding to same; both the first voice processing unit 72 and the first control unit 73 can be electronically connected with the first storage unit 77, or the first storage unit 77 can be integrated in the first voice processing unit 72 or the first control unit 73.

The auxiliary lamp device 8 in the system of this embodiment can comprises a second audio collection element 81, a second voice processing unit 82, a second control unit 83, a second electroluminescent element 84, and a second RF communication module 85 communicably connected with the first RF communication module 75; the second audio collection element 81 is electronically connected with second voice processing unit 82; the second voice processing unit 82, the second electroluminescent element 84 and the second RF communication module 85 are all electronically connected with the second control unit 83; the auxiliary lamp device 8 further comprises a second storage unit 86 containing pre-stored voice sample data of commands to operate the lamp, voice ID data of lamps in the voice recognition lamp control system and radio frequency communication addresses corresponding to same; both the second voice processing unit 82 and the second control unit 83 can be electronically connected with the second storage unit 86, or the second storage unit 86 can be integrated in the second voice processing unit 82 or the second control unit 83.

In the present embodiment, the main lamp device 7 and the auxiliary device 8 may be the voice recognition lamps in the first embodiment (whose operation principle is the same as that of the voice recognition lamp in the first embodiment). When the user gives an audio information of operating commands (such as "switch on XX lamp, switch off XX lamp, delay switching off XX lamp for 5 minutes, switch on XX lamp after 10 minutes") to any one of the lamps in the system (may be the main lamp device 7 or the auxiliary lamp device 8), the voice processing unit of the lamp will match the audio information from the user with the pre-stored voice ID data (comprising the voice ID data of any of the main lamp device 7 or the auxiliary lamp device 8 in the voice recognition lamp control system) and the voice sample data of operating commands to acquire the radio frequency communication address and the operating command corresponding to the audio information, and to send the acquired radio frequency communication address and operating command to the control unit; based on the radio frequency communication address, the control unit sends the operating command (the operating command here may be "switching on" or "switching off" performed immediately, also may be "delaying switch on" or "delaying switch off" in a few minutes, it can also be expressed as "switch on XX lamp for 15 minutes" which is a combination command comprising a "switching on" immediately command and a "delaying switch off" command) to the voice recognition lamp (may be the main lamp device 7 or the auxiliary lamp device 8) corresponding to the radio frequency communication address through the RF communication module to control the voice recognition lamp corresponding to the radio frequency communication address to be switched on and off. It should be noted that the main lamp device 7 and the auxiliary lamp device 8 may be communicably connected via an RF communication module, and the plurality of auxiliary lamp devices 8 may be communicatively connected via an RF communication module.

It should be noted that the difference between the main lamp device 7 and the auxiliary lamp device 8 is that the auxiliary lamp unit 8 has a low cost because it does not have a WIFI unit. In a practical application of a network having a distance of tens of meters to hundreds of meters, one main lamp device 7 can cooperate with a plurality of auxiliary lamp devices 8. For example, a main lamp device 7 (chandelier) is arranged in a room, and a plurality of auxiliary lamp devices 8 (bed lamps, wall lamps) are collocated; the main lamp device 7 and the auxiliary lamp device 8 are connected by respective RF communication modules; when using, the user can issue voice commands to any of the lamps (e.g., switch on the chandelier); this lamp collects the audio information (that is the voice command) by its audio collection element (that is the microphone), matches the audio information via the voice processing unit; if matching, the control unit sends the operating command to the matched lamp (that is the chandelier) via its RF communication module to control the lamp to be switched on and off; if the voice command is for the lamp itself, the control unit directly controls the electroluminescent element to be switched on and off.

It should be noted that in the voice recognition lamp control system, there are may be one main lamp device 7 or a plurality of main lamp devices 7. The plurality of main lamp devices 7 are distributed according to demand, which can increase the use range of voice recognition lamp control system. For example, in a plurality of rooms, one main lamp device 7 is disposed in each room, and each main lamp device 7 is matched with a plurality of auxiliary lamp devices 8; a plurality of main lamp devices 7 are connected to the same wireless router network or WAN through respective WIFI units 76, and control instructions are transmitted through the wireless router network or the WAN in order to achieve that any lamp can control any other lamps in this voice recognition lamp control system.

Specifically, the first storage unit 77 of the main lamp device 7 further pre-stores voice ID data of each voice recognition lamp in other networks that can be communicated via WIFI, and its corresponding network address and radio frequency communication address.

In this embodiment, one main lamp device 7 can form a network with one or more auxiliary lamp devices 8 near it through respective RF communication modules. Different main lamp devices 7 are connected to the same wireless router network or WAN through the WIFI unit 76. The aforementioned network address refers to the address of a local area network connected through an RF communication module in a wireless router network or a WAN.

Figure 5:
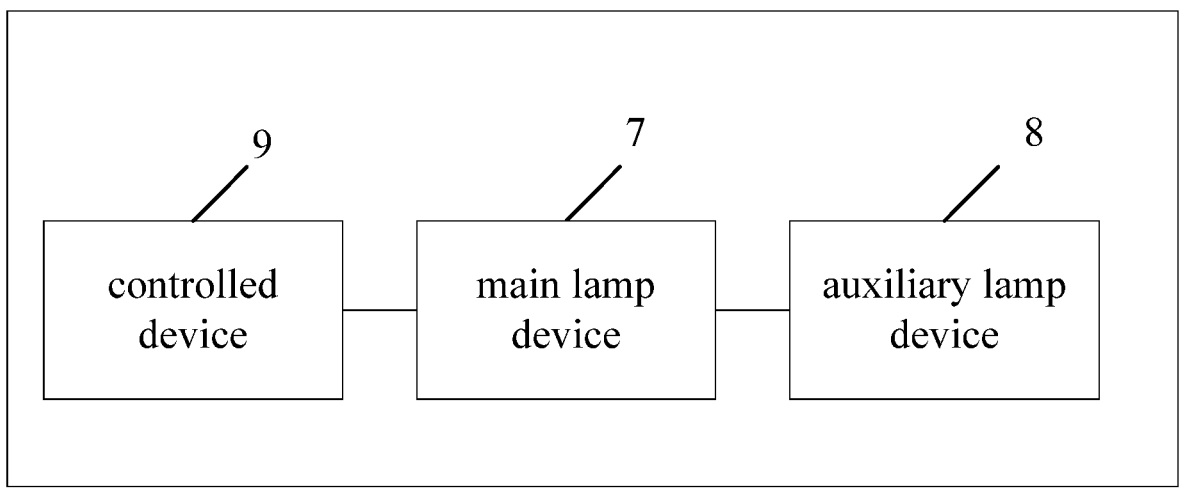
FIG. 5 is a schematic structural diagram of a voice recognition lamp control system according to a second embodiment of the present application.

Referring to FIG. 5, the voice recognition lamp control system further comprises at least one controlled device 9 (it can be an electric curtain, an exhaust fan, an air refresher or a controllable outlet). The controlled device 9 has a unique radio frequency communication address and corresponding voice ID data.

Figure 6:
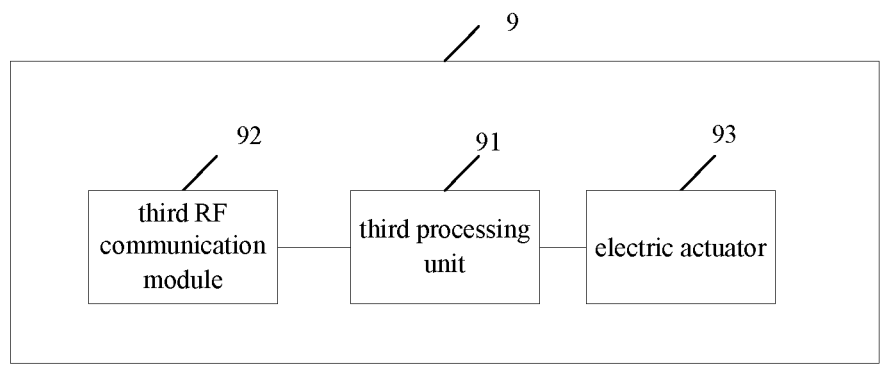
FIG. 6 is a schematic structural diagram of a controlled device according to a second embodiment of the present application.

The controlled device 9 shown in FIG. 6 comprises a third processing unit 91, and a third RF communication module 92 and an electric actuator 93; the third RF communication module 92 is communicably connected with the first RF communication module 75 or the second RF communication module 85; when the third RF communication module 92 is networked with the first RF communication module 75 and the second RF communication module 85, f the first storage unit 77 and the second storage unit 86 respectively store the radio frequency communication address of the controlled device 9 and the corresponding voice ID data; when any audio collection element in the voice recognition lamp control system (comprising the first audio collection element 71 and the second audio collection element 81) collects a voice command to operate the controlled device 9, the corresponding voice processing unit (the first voice processing unit 72 or the second voice processing unit 82) and the processing unit (the first control unit 73 or the second control unit 83) in the voice recognition lamp control system find out the radio frequency communication address of the controlled device 9, and sends the collected voice command to the third RF communication module 92 through the corresponding RF communication module (the first RF communication module 75 or the second RF communication module 85); after receiving the operating commands from the third RF communication module 92, the third processing unit 91 controls the electric actuator 93 to execute the operating commands. In this embodiment, electric actuator 93 can be a motor or circuit switch.

In this embodiment, the voice recognition lamp control system can not only realize mutual control among multiple lamps, but also control other controlled devices 9, such as: electric curtains, dehumidifiers, electric heating equipment, air conditioners, WiFi sockets, etc. In these controlled devices 9, only third RF communication modules 92 may be installed; via the communication connection between the third RF communication module 92 and the nearby main lamp device 7 or the auxiliary lamp device 8, the controlled device 9 can be communicated with the main lamp device 7 and the auxiliary lamp device 8; the radio frequency communication address and the corresponding voice ID data of the controlled device 9 are stored in the first storage unit 77 and the second storage unit 88; in this way, the user can control the start or stop of the controlled device 9 by giving a command to the main lamp device 7 or the auxiliary lamp device 8.

Figure 7:
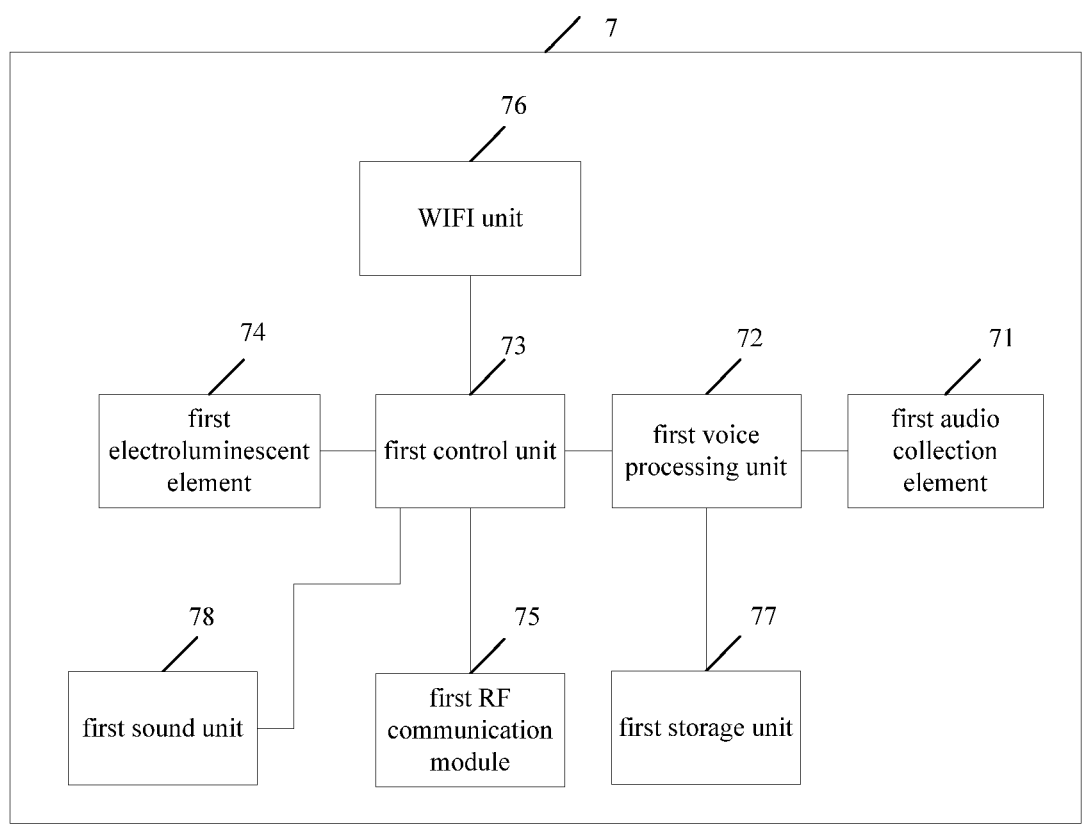
FIG. 7 is a schematic structural diagram of a main lamp device according to a second embodiment of the present application.

Referring to FIG. 7, the main lamp device 7 of this embodiment further comprises a first sound unit 78 connected with the first control unit 73; when receiving a voice play command from the first RF communication module 75 or the first voice processing unit 72, the first control unit 73 controls the first sound unit 78 to sound.

Figure 8:
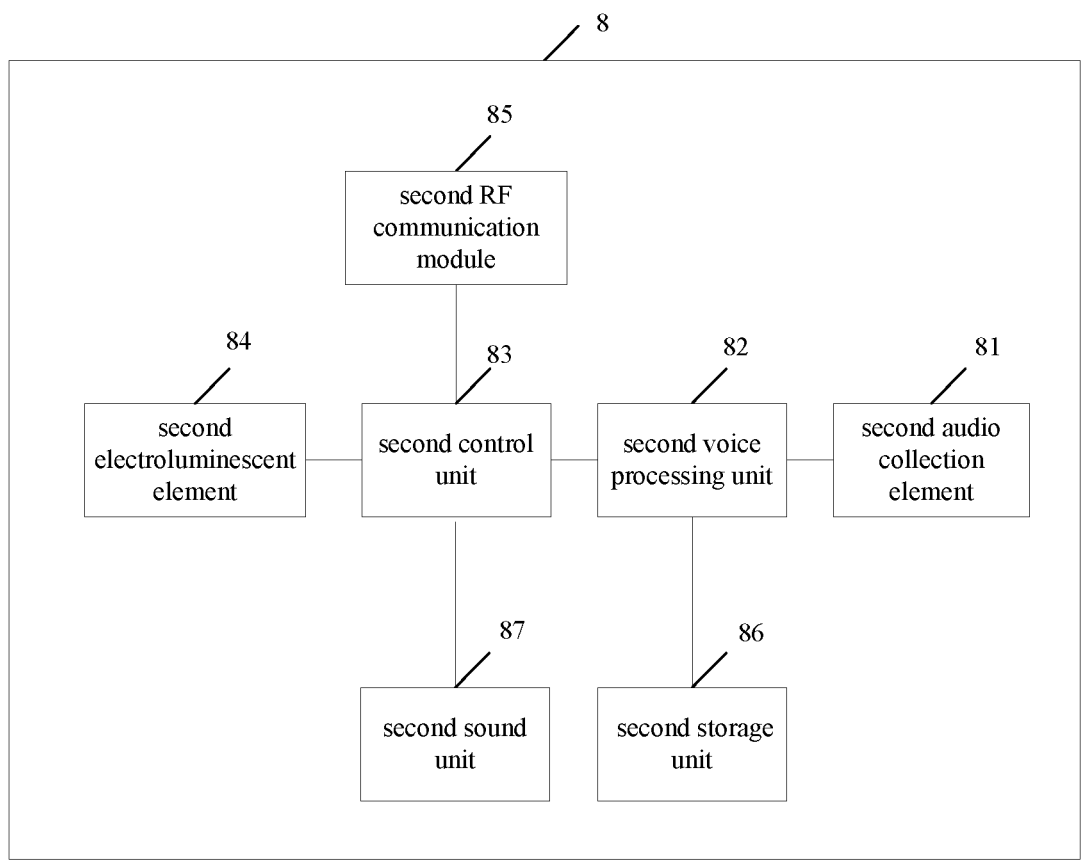
FIG. 8 is a schematic structural diagram of an auxiliary lamp device according to a second embodiment of the present application.

Referring to FIG. 8, the auxiliary lamp device 8 of this embodiment further comprises a second sound unit 87 connected with the second control unit 83; when receiving a voice play command from the second RF communication module 85 or the second voice processing unit 82, the second control unit 83 controls the second sound unit 87 to sound.

In the embodiment of the present application, a main lamp device and an auxiliary lamp device are set in the voice recognition lamp control system; the main lamp devices are communicatively connected via their WIFI units, and the main lamp device and the auxiliary lamp device are connected via their respective RF communication modules. Both the main lamp device and the auxiliary lamp device comprise their respective audio collection elements, voice processing units and storage units; and the storage units contain pre-stored voice sample data of commands to operate the lamp, voice ID data of lamps in the voice recognition lamp control system and radio frequency communication addresses corresponding to same. In this way, when the user gives an voice operating commands to any lamp in the voice recognition lamp control system, the voice processing unit of this lamp matches the voice operating commands with the pre-stored voice ID data and the operating sample data to acquire the radio frequency communication address and the operating command corresponding to the voice operating commands, and to send the radio frequency communication address and the operating command to the control unit of the lamp; based on the radio frequency communication address, the control unit of the lamp sends the operating command to the corresponding voice recognition lamp to control the voice recognition lamp to be switched on and off; meanwhile, the control unit of the lamp can receive the operating command transmitted from other voice recognition lamps in the voice recognition lamp control system through the RF communication module, and based on the received operating command to control the electroluminescent element to be switched on and off. This voice recognition lamp control system is simple in operation, convenient in use, and has a good user experience. Moreover, due to the use of RF communication networking, the cost is low. In addition, since only one main lamp device is required to be equipped with a WIFI unit in a network, it is possible to communicate with other voice recognition lamps at a low cost. The system of the present application can also be equipped with controlled devices, for example, curtains, etc. After networked by the RF, voice-controlled curtains and the like can also be performed under any networked voice recognition lamp. As such, the system of the present application can also be accessed by the mobile smart terminal via the main lamp device, and be set up and controlled by it.

The above-mentioned serial number of the embodiment of the present application is only for description, does not represent the advantages and disadvantages of the embodiment.

The foregoing descriptions are merely preferred embodiments of the present invention and are not intended to limit the present invention. Any modifications, equivalent replacements and improvements made within the spirit and principle of the present invention shall be included in the protection of the present invention. Within range.

The invention claimed is:

1. A voice recognition lamp capable of networking, wherein, comprising an audio collection element (1), a voice processing unit (2), a control unit (3), an electroluminescent element (4), a RF communication module (5) capable of networking with other voice recognition lamps, and a storage unit (23) containing pre-stored voice sample data of commands to operate the lamp, voice ID data of the lamps in the network and radio frequency communication addresses corresponding to same; the audio collection element (1) is configured to collect audio information, and send the audio information to the voice processing unit (2); the voice processing unit (2) is configured to match the audio information from the audio collection element (1) and the pre-stored data in the storage unit (23) to acquire radio frequency communication addresses and operating commands corresponding to the matched audio information, and send the radio frequency communication addresses and operating commands to the control unit (3); the control unit (3) is configured to control the RF communication module (5) to send operating commands to other voice recognition lamps corresponding to the radio frequency communication addresses, or to respond to the operating commands from the RF communication module (5), or to respond to the operating commands from the voice processing unit (2), to control the electroluminescent element (4) to execute the corresponding operating commands; the operating commands are at least one of "switch on", "switch off", "delay switching on", "delay switching off".

2. The voice recognition lamp according to claim 1, wherein, the voice processing unit (2) comprises: a preamplifier circuit (21) connecting with an output of the audio collection element (1), an analog-to-digital converter (22) being used for converting an amplified signal to a digital signal, and a processor (23) being used for processing the digital signal; the processor (23) has a built-in or external storage (24) containing pre-stored voice sample data of commands to operate the lamp, voice ID data of the lamps in the network and radio frequency communication addresses corresponding to same.

3. The voice recognition lamp according to claim 1, wherein, further comprising a WIFI unit (6) being used for accessing a wireless router network or WAN, and the WIFI unit (6) is electronically connected with the control unit (3).

4. The voice recognition lamp according to claim 3, wherein, the storage unit (23) further storages voice ID data of the voice recognition lamps capable of networking with anther network through the WIFI unit (6), and its corresponding network address and radio frequency communication address;

the control unit (3) confirms whether an operation command sender has permission to operate when receiving the operating commands and radio frequency communication address for the voice recognition lamps of the network from other networks through the WIFI unit (6);

if the operation command sender has permission to operate, transmitting the received operating commands to the voice recognition lamp having the received radio frequency communication address through the RF communication module (5);

when the control unit (3) receives an operating command for a voice recognition lamp of another network recognized by the voice processing unit (2), the operating command and a network address and a radio frequency communication address of the voice recognition lamp to be operated by the operating command are sent to the control unit (3) of the corresponding network address through the WIFI unit (6);

the control unit (3) of the corresponding network address sends the operating command to the control unit (3) of the corresponding radio frequency communication address through the RF communication module (5); when the control unit (3) sends the operating command, if detecting that the WIFI unit (6) cannot access the wireless router network or the WAN, sounding that the voice command fails.

5. The voice recognition lamp according to claim 4, wherein, further comprising a sound unit (52) connecting with the control unit (3), the control unit (3) controls the sound unit (52) to sound when receiving a voice play command from the RF communication module (5) or the voice processing unit (2).

6. A voice recognition lamp control system, wherein, comprising a main lamp device (7) and at least one auxiliary lamp device (8), each of the main lamp device (7) and the auxiliary lamp device (8) has a unique radio frequency communication address and corresponding voice ID data, and the voice ID data can be set and changed;

the main lamp device (7) comprising a first audio collection element (71), a first voice processing unit (72), a first control unit (73), a first electroluminescent element (74), a first RF communication module (75) and a WIFI unit (76); the first audio collection element (71) is electronically connected with the first voice processing unit (72); the first voice processing unit (72), the first electroluminescent element (74), the first RF communication module (73) and the WIFI unit (76) are all electronically connected with the first control unit (73); the main lamp device (7) further comprises a first storage unit (77) containing pre-stored voice sample data of commands to operate the lamp, voice ID data of lamps in the voice recognition lamp control system and radio frequency communication addresses corresponding to same;

the auxiliary lamp device (8) comprises a second audio collection element (81), a second voice processing unit (82), a second control unit (83), a second electroluminescent element (84), and a second RF communication module (85) communicably connected with the first RF communication module (75); the second audio collection element (81) is electronically connected with second voice processing unit (82); the second voice processing unit (82), the second electroluminescent element (84) and the second RF communication module (85) are all electronically connected with the second control unit (83); the auxiliary lamp device (8) further comprises a second storage unit (86) containing pre-stored voice sample data of commands to operate the lamp, voice ID data of lamps in the voice recognition lamp control system and radio frequency communication addresses corresponding to same.

7. The voice recognition lamp control system according to claim 6, wherein, the first storage unit (77) of the main lamp device (7) further pre-stores voice ID data of each voice recognition lamp in other networks that can be communicated via WIFI, and its corresponding network address and radio frequency communication address.

8. The voice recognition lamp control system according to claim 6, wherein, further comprises at least one controlled device (9); the controlled device (9) has a unique radio frequency communication address and corresponding voice ID data; each of the controlled device (9) comprises a third processing unit (91), a third RF communication module (92) and an electric actuator (93); the third RF communication module (92) is communicably connected with the first RF communication module (75) or the second RF communication module (85); when the third RF communication module (92) is networked with the first RF communication module (75) and the second RF communication module (85), the first storage unit (77) and the second storage unit (86) respectively store the radio frequency communication address of the controlled device (9) and the corresponding voice ID data; when any audio collection element in the voice recognition lamp control system collects a voice command to operate the controlled device (9), the corresponding voice processing unit and processing unit in the voice recognition lamp control system find out the radio frequency communication address of the controlled device (9), and sends the collected voice command to the third RF communication module (92) through the corresponding RF communication module; after receiving the operating commands from the third RF communication module (92), the third processing unit (91) controls the electric actuator (93) to execute the operating commands.

9. The voice recognition lamp control system according to any of claim 6, wherein, the main lamp device (7) further comprises a first sound unit (78) connected with the first control unit (73); when receiving a voice play command from the first RF communication module (75) or the first voice processing unit (72), the first control unit (73) controls the first sound unit (78) to sound.

10. The voice recognition lamp control system according to any of claim 6, wherein, the auxiliary lamp device (8) further comprises a second sound unit (87) connected with the second control unit (83); when receiving a voice play command from the second RF communication module (85) or the second voice processing unit (82), the second control unit (83) controls the second sound unit (87) to sound.

* * * * *